United States Patent [19]

Hall et al.

[11] Patent Number: 4,692,508

[45] Date of Patent: Sep. 8, 1987

[54] VINYLIDENE CHLORIDE INTERPOLYMER POSSESSING IMPROVED EXTRUDABILITY

[75] Inventors: Mark J. Hall; Kun S. Hyun, both of Midland, Mich.

[73] Assignee: The Dow Chemical Company, Midland, Mich.

[21] Appl. No.: 811,214

[22] Filed: Dec. 20, 1985

[51] Int. Cl.$^4$ .................................................. C08F 6/00
[52] U.S. Cl. .................................... 528/503; 525/343
[58] Field of Search ......................... 528/503; 525/343

[56] References Cited

U.S. PATENT DOCUMENTS 4,020,267 4/1977 Park ..................................... 528/503

*Primary Examiner*—Christopher Henderson
*Attorney, Agent, or Firm*—Thomas J. Mielke

[57] ABSTRACT

A process for improving the extrudability of a vinylidene chloride interpolymer pellet. A vinylidene chloride interpolymer pellet displaying a first endotherm, as determined by differential scanning calorimetry according to American Society of Testing and Materials Test Method D-3417, below 75° Celsius is exposed to a temperature above about 55° Celsius for a length of time sufficient to raise said first endotherm to 75° Celsius or above. Pellets treated in such a manner possess improved extrudability.

9 Claims, No Drawings

VINYLIDENE CHLORIDE INTERPOLYMER POSSESSING IMPROVED EXTRUDABILITY

BACKGROUND OF THE INVENTION

The present invention relates to a vinylidene chloride interpolymer. Specifically, the present invention relates to pellets of a vinylidene chloride interpolymer which pellets possess improved extrudability.

Vinylidene chloride interpolymers are well-known in the prior art. In the past, vinylidene chloride interpolymers have been produced by an emulsion or suspension polymerization process. Both the emulsion and suspension polymerization processes produce an aqueous dispersion of polymer particles having a relatively small particle diameter. The polymer particles are recovered from the aqueous dispersion by drying or other means for removing a majority of the aqueous phase. In the past, the practice has been to extrude the vinylidene chloride interpolymer directly from the form in which it is recovered.

In some instances, it is desirable to form the vinylidene chloride interpolymer into pellets prior to extrusion. Unfortunately, it has been found that such pellets are not easily extrudable. Attempts to extrude vinylidene chloride interpolymer pellets on certain extrusion equipment have proven unsatisfactory due to variations in extrustion rate, torque within the extruder, and pressure within the extruder. Unsatisfactory results are particularly evident during start-up of the extrusion process. It is believed that the variations in extrusion rate, torque, and pressure are a result of poor forwarding of the vinylidene chloride interpolymer within the extruder.

It is desirable to produce a vinylidene chloride interpolymer pellet which pellet is capable of being extruded without exhibiting variations in extrusion rate, torque within the extruder, and pressure within the extruder. It is to this goal that the present invention is directed.

SUMMARY OF THE INVENTION

The present invention concerns a process for improving the extrudability of a vinylidene chloride interpolymer, said vinylidene chloride interpolymer being in the form of pellets, said vinylidene chloride interpolymer pellets displaying a first endotherm, as determined by differential scanning calorimetry according to American Society for Testing and Materials Test Method D-3417, below 75° Celsius, wherein the process comprises: exposing said vinylidene chloride interpolymer pellets to a temperature above about 55° Celsius for a length of time sufficient to raise said first endotherm to 75° Celsius or above.

Additionally, the present invention concerns pellets formed by the above described process.

DETAILED DESCRIPTION OF THE INVENTION

Vinylidene chloride interpolymers suitable for use in the present invention are those vinylidene chloride interpolymers formed from vinylidene chloride and an amount of one or more monoethylenically unsaturated monomers copolymerizable with vinylidene chloride.

The vinylidene chloride interpolymers have polymerized therein vinylidene chloride in an amount of from about 40 to about 98 weight percent, beneficially from about 50 to about 96 weight percent, and desirably from about 60 to about 94 weight percent, based on total weight of the vinylidene chloride interpolymer.

The vinylidene chloride interpolymer comprises one or more monoethylenically unsaturated monomer copolymerizable with vinylidene chloride. The amount of monoethylenically unsaturated monomer is suitably from about 60 to about 2 weight percent, beneficially from about 50 to about 4 weight percent, and desirably from about 40 to about 6 weight percent, based on total weight of the vinylidene chloride interpolymer.

Monoethylenically unsaturated monomers suitable for use in the present invention include vinyl chloride, alkyl acrylates, alkyl methacrylates, acrylic acid, methacrylic acid, itaconic acid, acrylonitrile, and methacrylonitrile. The ethylenically unsaturated monomers are desirably selected from the group consisting of vinyl chloride, alkyl acrylates, and alkyl methacrylates, the alkyl acrylates and alkyl methacrylates having from about 1 to about 8 carbon atoms per alkyl group. The alkyl acrylates and alkyl methacrylates perferably have from about 1 to about 4 carbon atoms per alkyl group. The alkyl acrylates and alkyl methacrylates are most preferably selected from the group consisting of methylacrylates, ethylacrylates, and methylmethacrylates.

Methods of forming the vinylidene chloride interpolymers suitable for use in the present invention are well-known in the prior art. The vinylidene chloride interpolymer is generally formed through an emulsion or suspension polymerization process. Exemplary of such processes are U.S. Pat Nos. 2,558,728; 3,007,903; 3,642,743; and 3,879,359; and the methods described by R. A. Wessling, in *Polyvinylidene Chloride*, Gordon and Breach Science Publishers, New York, 1977, Chapter 3; all of which are incorporated herein by reference. Typically, the monomeric materials are emulsified or suspended in an aqueous phase. The aqueous phase contains a polymerization initiator and a surface active agent capable of emulsifying or suspending the monomeric materials in the aqueous phase. The polymerization of the monomeric materials is usually carried out with heating and agitation. After polymerization is complete, the resulting suspension or emulsion of vinylidene chloride interpolymer has a majority of the aqueous phase removed.

The vinylidene chloride interpolymer which results from suspension or emulsion polymerization of the vinylidene chloride interpolymer is then pelletized. Methods of forming the vinylidene chloride interpolymer into pellets are well-known to those skilled in the art. Any method capable of forming the vinylidene chloride interpolymer into pellets is suitable for use in the present invention. For the purposes of this application, the terms "pellet" or "pellets" refer to particles having a minimum cross-sectional dimension of at least 1/32 inch, beneficially of at least 1/16 inch, and preferably of at least ⅛ inch. Said pellets suitably have a maximum cross-sectional dimension of at least ½ inch, beneficially of at least ⅜ inch, and preferably of at least ¼ inch. Exemplary of a method suitable for use in forming the pellets of vinylidene chloride interpolymer are extrusion through a strand die and pelletization by chopping the extruded strand into pellets.

The vinylidene chloride interpolymer pellets of the present invention may contain a number of additives well-known to those skilled in the art. Exemplary of additives which may be incorporated in the vinylidene chloride interpolymer pellets of the present invention are plasticizers, heat stabilizers, light stabilizers, pigments, processing aids, lubricants, and the like. Each of these additives is known and several types of each are commercially available.

The pellets of vinylidene chloride interpolymer display a first endotherm, as determined by differential scanning calorimetry according to American Society for Testing and Materials Test Method D-3417, below 75° Celsius. By the term "first endotherm" is meant the endotherm revealed through differential scanning calorimetry which occurs at the lowest temperature. Additionally, in order to be considered an endotherm within the scope of the term as used in the present invention, it is necessary that the endotherm revealed through differential scanning calorimetry represent a morphological change consuming more than 0.3 Joules of energy per gram of polymer.

The differential scanning calorimetry used in the present invention to determine the location of the first endotherm is practiced in accordance with American Society for Testing and Materials Test Method D-3417 as approved for use in 1975.

Pellets of vinylidene chloride interpolymer displaying a first endotherm below 75° Celsius have been found to be difficult to extrude. It is believed that the difficulty in extrusion is related to poor forwarding to the vinylidene chloride interpolymer pellets within the extruder.

Applicants have discovered that exposing the pellets of vinylidene chloride interpolymer to a temperature above about 55° Celsius for a length of time sufficient to raise said first endotherm to 75° Celsius or above results in vinylidene chloride interpolymer pellets which extrude well.

The vinylidene chloride interpolymer pellets are exposed to a temperature above about 55° Celsius, beneficially the vinylidene interpolymer pellets are exposed to a temperature between about 70° Celsius and about 100° Celsius. Preferably, the vinylidene chloride interpolymer pellets are exposed to a temperature between about 85° Celsius and about 95° Celsius. The vinylidene chloride interpolymer pellets are exposed to the elevated temperatures for a length of time sufficient to raise the first endotherm to 75° Celsius or above, beneficially to 80° Celsius or above and desirably to 90° Celsius or above.

The length of time for which the vinylidene chloride interpolymer pellets must be exposed to a temperature above about 55° Celsius depends, in part, upon the temperature chosen. For example, when the pellets are exposed to a temperature of about 55° Celsius, exposure must continue for a period of about 26 hours to raise the first endotherm above about 75° Celsius. However, when the pellets are exposed to a temperature of about 90° Celsius, exposure need only continue for a period of about 1 minute.

In any event, the temperature of exposure and time of exposure are chosen so that the vinylidene chloride interpolymer does not degrade to an unacceptable level.

In one prefered embodiment of the present invention, the vinylidene chloride interpolymers are exposed to a temperature of about 90° Celsius for a length of time of about one minute. This temperature and time combination has been found sufficient to raise the first endotherm of a vinylidene chloride interpolymer pellet comprising about 85 weight percent vinylidene chloride and about 15 weight percent vinyl chloride based on total vinylidene chloride interpolymer weight, to about 90° Celsius.

The optimum combination of temperature and time for a particular vinylidene chloride interpolymer pellet can be easily determined through a series of simple experiments. Moreover, it appears that once the minimum time and temperature combination to raise the first endotherm to 75° Celsius or above has been reached, continued exposure of the vinylidene chloride interpolymer pellets to the elevated temperature does not appear to harm the vinylidene chloride interpolymer pellets so long as the temperature is not raised to a point such that an unacceptable amount of degradation occurs in the vinylidene chloride interpolymer pellet.

The vinylidene chloride interpolymer pellets processed according to the present invention can be extruded or otherwise processed into films or a variety of other articles.

The present invention is illustrated in further detail by the following examples. The examples are for purposes of illustration only, and are not to be construed as limiting the scope of the present invention. All parts and percentages are by weight unless otherwise specifically noted.

EXAMPLES

Example 1

A vinylidene chloride interpolymer is formed through a suspension polymerization process. The vinylidene chloride interpolymer is formed from a monomer mixture comprising about 80 weight percent vinylidene chloride and about 20 weight percent vinyl chloride based on total monomer mixture weight. The vinylidene chloride interpolymer powder produced from the suspension polymerization process is pelletized by extrusion through a strand die and subsequently chopping the strand into pellets. The pellets have an average length of about 0.130 inch and an average diameter of about 0.145 inch. The vinylidene chloride interpolymer pellets thus formed exhibits a first endotherm at about 60° Celsius.

The vinylidene chloride interpolymer pellets are exposed to a temperature of about 100° Celsius for about 21 hours. After exposure to the elevated temperature, the vinylidene chloride interpolymer pellets exhibit a first endotherm at about 92° Celsius. The vinylidene chloride interpolymer pellets thus treated are extruded in a 2.5 inch extruder under normal extrusion conditions for a vinylidene chloride interpolymer. The vinylidene chloride interpolymer pellets are found to extrude well and maintain a relatively constant rate, torque, and pressure.

Example 2

The vinylidene chloride interpolymer pellets produced as described above in the first paragraph of Example 1 are exposed to a temperature of about 100° Celsius for about 1 minute. The vinylidene chloride interpolymer pellets thus treated exhibit a first endotherm of greater than 90° Celsius. The vinylidene chloride interpolymer pellets are found to extrude well, maintaining a relatively constant rate, torque, and pressure.

What is claimed is:

1. A process for improving the extrudability of a vinylidene chloride interpolymer, said vinylidene chloride interpolymer being formed from a monomer mixture comprising at least 40 weight percent vinylidene chloride and being in the form of pellets, said vinylidene chloride interpolymer pellets displaying a first endotherm, as determined by differential scanning calorimetry according to American Society for Testing and Materials Test Method D-3417, below 75° Celsius, wherein the process comprises: exposing said vinylidene chloride interpolymer pellets to a temperature above about 55° Celsius for a length of time sufficient to raise said first endotherm to 75° Celsius or above.

2. The process of claim 1, wherein the vinylidene chloride interpolymer pellets are exposed to a temperature above about 70° Celsius.

3. The process of claim 1, wherein the vinylidene chloride interpolymer pellets are exposed to a temperature above about 85° Celsius.

4. The process of claim 1, wherein the interpolymer pellets are exposed to a temperature above about 55° Celsius for a length of time of from about 1 hour to about 30 hours.

5. The process of claim 2, wherein the vinylidene chloride interpolymer pellets are exposed to a temperature above about 70° Celsius for a length of time of from about 1 minute to about 20 hours.

6. The process of claim 3, wherein the vinylidene chloride interpolymer pellets are exposed to a temperature above about 85° Celsius for a length of time of from about 30 seconds to about 1 hour.

7. The process of claim 1, wherein the vinylidene chloride interpolymer pellets have a maximum cross-sectional dimension of from about ½ inch to about ¼ inch, and a minimum cross-sectional dimension of from about 1/16 inch to about ⅛ inch.

8. The process of claim 1, wherein the first endotherm is raised to 80° Celsius or above.

9. The process of claim 1, wherein the first endotherm is raised to 90° Celsius or above.

* * * * *